US012570058B2

(12) United States Patent
Hussain

(10) Patent No.: US 12,570,058 B2
(45) Date of Patent: Mar. 10, 2026

(54) SYSTEMS AND METHODS FOR PRODUCING A SPORTS BALL

(71) Applicant: Ali Hasnain Hussain, Richmond Hill (CA)

(72) Inventor: Ali Hasnain Hussain, Richmond Hill (CA)

( * ) Notice: Subject to any disclaimer, the term of this patent is extended or adjusted under 35 U.S.C. 154(b) by 174 days.

(21) Appl. No.: 18/619,971

(22) Filed: Mar. 28, 2024

(65) Prior Publication Data

US 2024/0343007 A1 Oct. 17, 2024

(51) Int. Cl.
| | |
|---|---|
| *B29D 22/04* | (2006.01) |
| *B29C 45/14* | (2006.01) |
| *B29C 53/04* | (2006.01) |
| *B29C 69/00* | (2006.01) |
| *B29C 71/02* | (2006.01) |
| *B29K 21/00* | (2006.01) |
| *B29K 75/00* | (2006.01) |

(52) U.S. Cl.
CPC ........ *B29D 22/04* (2013.01); *B29C 45/14008* (2013.01); *B29C 53/04* (2013.01); *B29C 69/001* (2013.01); *B29C 71/02* (2013.01);

*B29C 2045/1404* (2013.01); *B29K 2021/003* (2013.01); *B29K 2075/00* (2013.01)

(58) Field of Classification Search
CPC ..... B29C 43/18; B29C 43/183; B29C 43/184; B29C 45/14008; B29C 51/004; B29C 53/04; B29C 66/54; B29C 69/001; B29C 71/02; B29D 22/04
See application file for complete search history.

*Primary Examiner* — Stella K Yi

(74) *Attorney, Agent, or Firm* — Bajwa IP Law Firm; Haris Zaheer Bajwa

(57) ABSTRACT

A method for forming a plurality of panels, which may comprise cutting a plurality of Polyurethane (PU) layer cutouts corresponding to a respective shape for each of the plurality of panels from a sheet of PU, placing each of the plurality of PU layer cutouts in a corresponding mold, forming each respective panel in each respective corresponding mold by injecting melted TPE into each of the corresponding molds for thirty to forty seconds, and creating a bladder valve panel by inserting a valve in one of the plurality of created panels. Method may further comprise forming a pre-finalized ball by attaching the plurality of the panels including the bladder valve panel to a bladder and respective edges to each of the plurality of the panels to respective edges of adjacent panels of the plurality of the panels, and placing the pre-finalized sports ball in a mold and applying heat to the pre-finalized sports ball.

8 Claims, 17 Drawing Sheets

SYSTEMS AND METHODS FOR PRODUCING A SPORTS BALL

TECHNICAL FIELD

The present disclosure relates generally to a ball and a method for manufacturing a ball. More particularly, and without limitation, the present disclosure relates to structures and methods for manufacturing a sports ball.

BACKGROUND

Conventional thermos-bonded sports balls with internal bladder have numerous drawbacks including required numerous complicated steps in their manufacturing taking longer time and creating unnecessary wastage during these numerous processes and investment in machinery for every step of manufacturing. Therefore, for increasing manufacturing capacity, there is a need for significantly increasing manpower and cost.

Exemplary embodiments, consistent with the present disclosure, therefore, aim to resolve the aforementioned problems including allowing for the same quality and consistency of balls during usage but allowing for more cost-effective and time effective manufacturing mechanisms, among others.

SUMMARY

An object of the invention is to provide a new and improved sports ball having a high performance, synthetic leather balls that are of high quality but are manufactured utilizing exemplary approaches, providing high durability while also providing manufacturing cost-efficiency in terms of time and costs.

In an exemplary embodiment, a manufacturing method of a sports ball is provided. Exemplary methods comprise the steps of forming a plurality of panels, which may comprise cutting a plurality of Polyurethane (PU) layer cutouts corresponding to a respective shape for each of the plurality of panels from a sheet of PU, placing each of the plurality of PU layer cutouts in a corresponding mold, forming each respective panel in each respective corresponding mold by injecting melted TPE into each of the corresponding molds for thirty to forty seconds, and creating a bladder valve panel by inserting a valve in one of the plurality of created panels. Exemplary method may further comprise forming a pre-finalized ball by attaching the plurality of the panels including the bladder valve panel to a bladder and respective edges to each of the plurality of the panels to respective edges of adjacent panels of the plurality of the panels, and placing the pre-finalized sports ball in a mold and applying heat to the pre-finalized sports ball.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

FIG. 2 illustrates an exemplary PU Sheet, consistent with one or more exemplary embodiments of the present disclosure;

DETAILED DESCRIPTION

A sports ball is traditionally made up of two major components, a bladder for air and a cover of panels. Embodiments consistent with the present disclosure enhance the performance of a sports ball by providing a method and structure for efficiently utilizing manufacturing techniques for forming sports balls. Specifically, exemplary embodiments provide for utilizing unique methods to form unique structures which allow for efficient produced thermo-bonded balls, in terms of monetary and time resources.

Figure 1A:
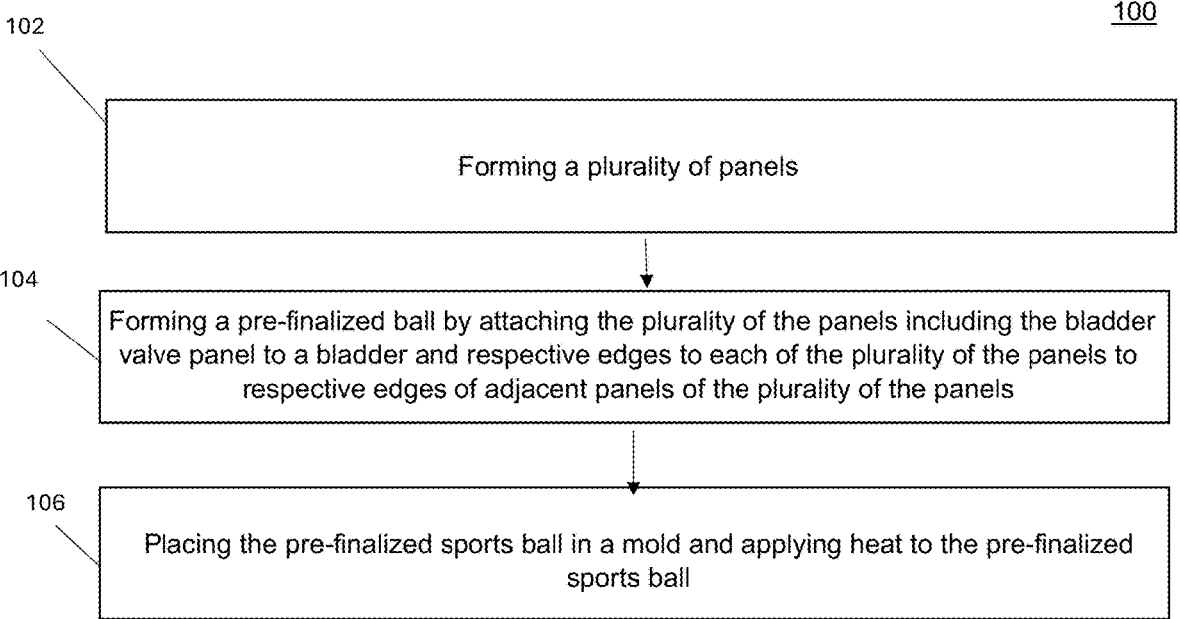
FIG. 1A illustrates an exemplary method for manufacturing a sports ball, consistent with one or more exemplary embodiments of the present disclosure.

FIG. 1A illustrates an exemplary method 100 for manufacturing a sports ball, consistent with one or more exemplary embodiments of the present disclosure.

With further details, with respect to method 100, step 102 may comprise of forming a plurality of panels, consistent with one or more exemplary embodiments of the present disclosure.

Figure 1B:
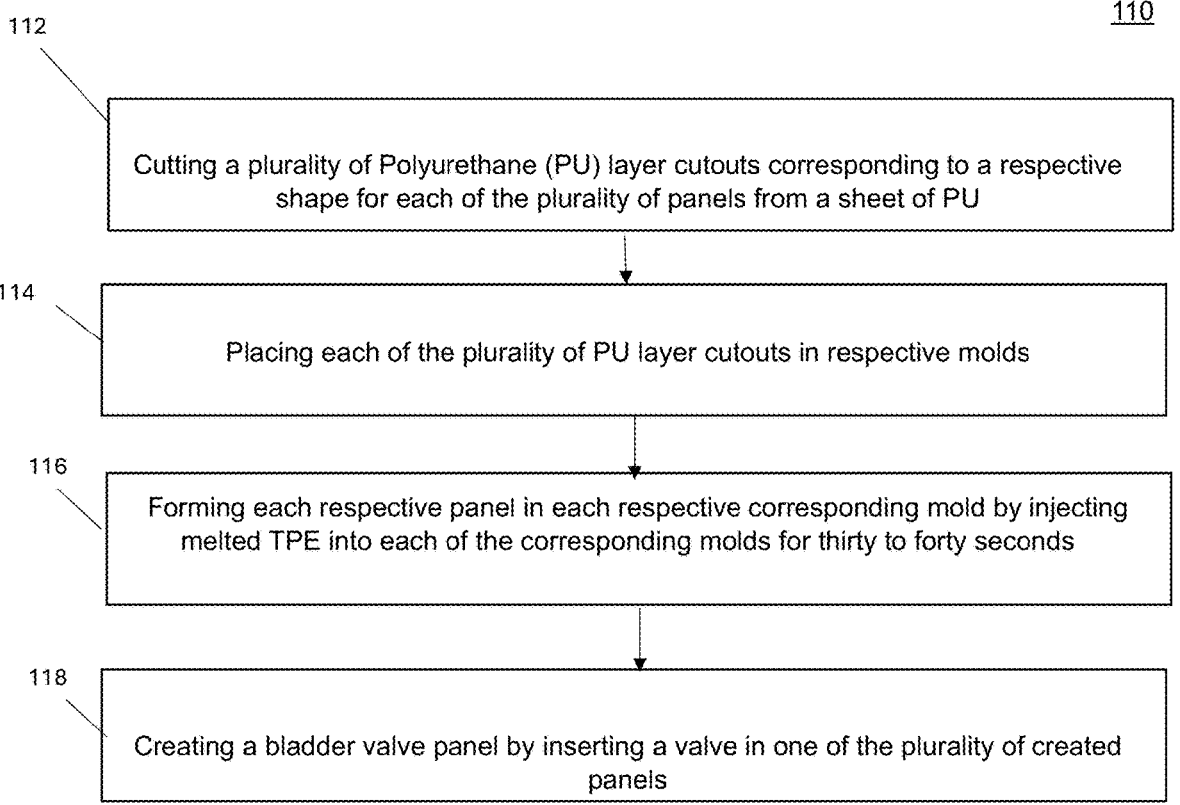
FIG. 1B illustrates an exemplary method for forming a plurality of panels, consistent with one or more exemplary embodiments of the present disclosure.

In an exemplary embodiment, FIG. 1B illustrates flowchart 110 comprising details of step 102.

In an exemplary embodiment, step 112 may comprise of cutting a plurality of Polyurethane (PU) layer cutouts corresponding to a respective shape for each of the plurality of panels from a sheet of PU. In an exemplary embodiment, step 112 may be understood in the context of FIGS. 2, 3A, and 3B.

Figure 2:
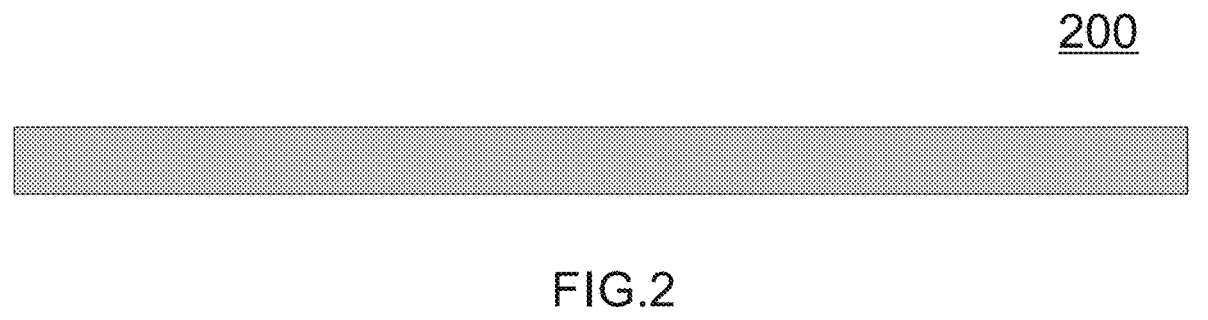

In an exemplary embodiment, FIG. 2 displays a PU Sheet 200. In an exemplary embodiment, PU Sheet 200 may have a thickness of 0.6 to 1.4 mm. In an exemplary embodiment, PU Sheet 200 may be a layer of Polyurethane (PU) or a similar synthetic material.

Figure 3A:
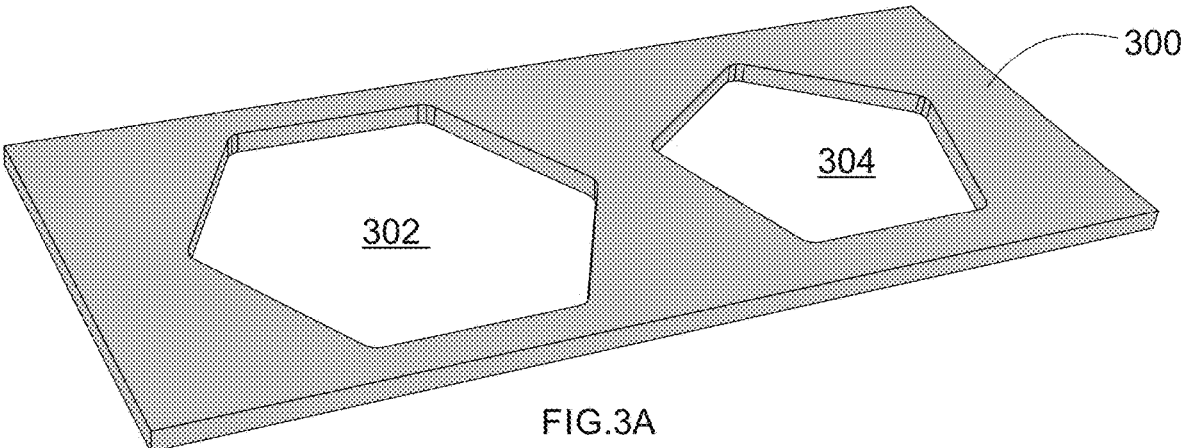
FIGS. 3A and 3B are illustrations of an exemplary scenario for cutting out a plurality of PU layer cutouts, consistent with one or more exemplary embodiments of the present disclosure.
Figure 3B:
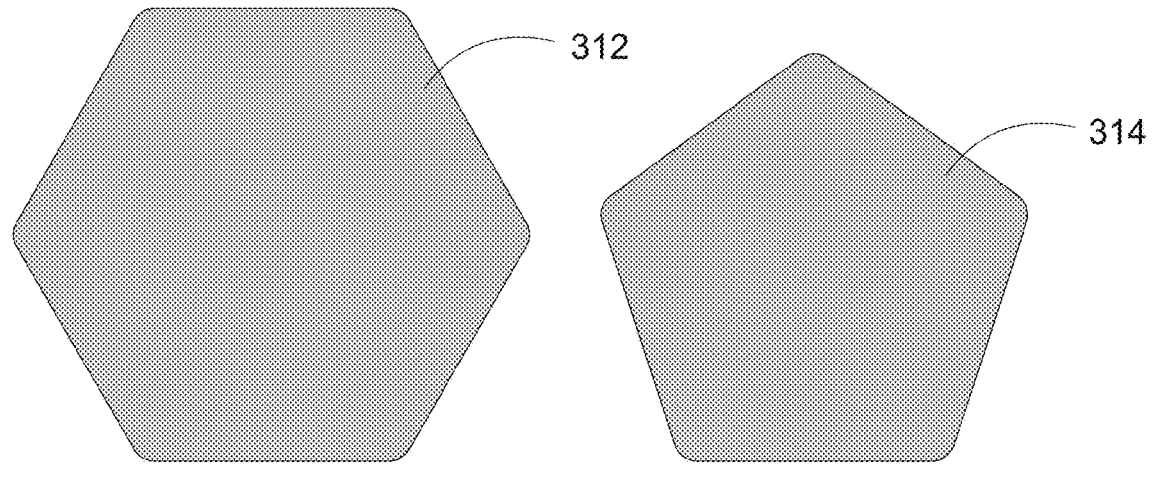

In an exemplary embodiment, FIGS. 3A and 3B are illustrations of an exemplary scenario for cutting out a plurality of PU layer cutouts, according to an embodiment of the present disclosure. As shown in FIG. 3A, required panel shapes (302 and 304) may be cut from layer 300 using conventional ball cutting knives. In an example embodiment, layer 300 may be an outer layer for panels of a sports ball similar to PU Sheet 200, consistent with exemplary embodiments of the present disclosure.

FIG. 3B illustrates exemplary cutouts 312 and 314 that may be cut from layer 300, for example from required panel shapes 302 and 304. In this exemplary scenario, cutouts 312 and 314 may represent a cutout of outer layer 300. In an exemplary embodiment, for each respective ball, there may be [4 to 20 cutouts which may all be transformed as explained in context of further steps below to collectively form the outside covering of a sports ball.

In an exemplary embodiment, step 114 may comprise of placing each of the plurality of PU layer cutouts in respective molds. In an exemplary embodiment, respective molds may have physical properties based on desired finalized shapes of finalized panels (as discussed in further detail below). Details of step 114 are explained in the context of FIGS. 4A, 4B, 5A, and 5B.

Figure 4A:
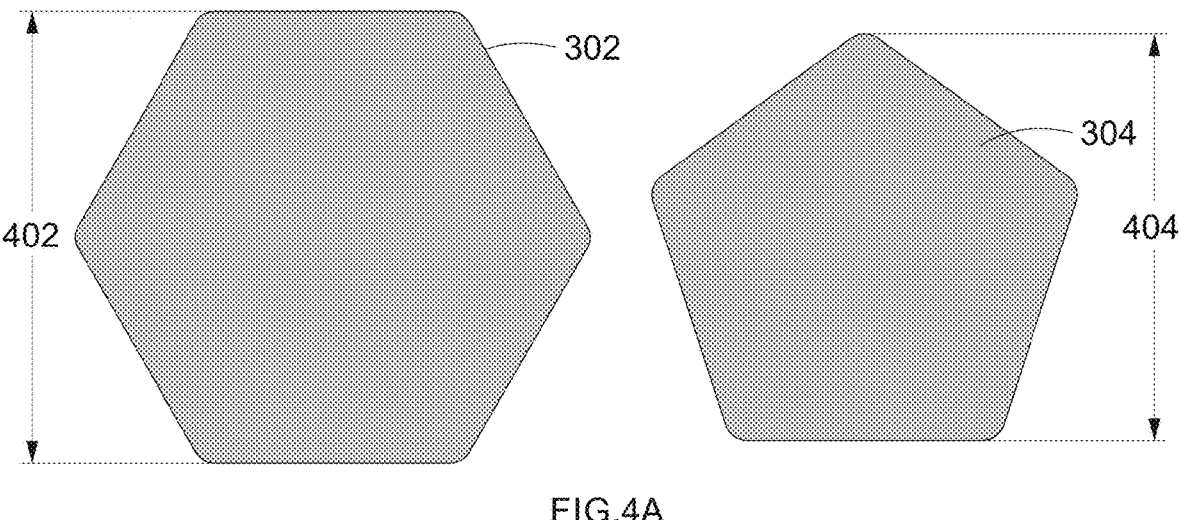
FIG. 4A illustrates dimensions of cutouts, consistent with one or more exemplary embodiments of the present disclosure.

In an exemplary embodiment, FIG. 4A illustrates dimensions of cutouts 302 and 304 respectively. An exemplary end-to-end height 402 of cutout 302 may be 87 mm, while an exemplary end-to-end height 404 of cutout 304 may be 78.3 mm.

Figure 4B:
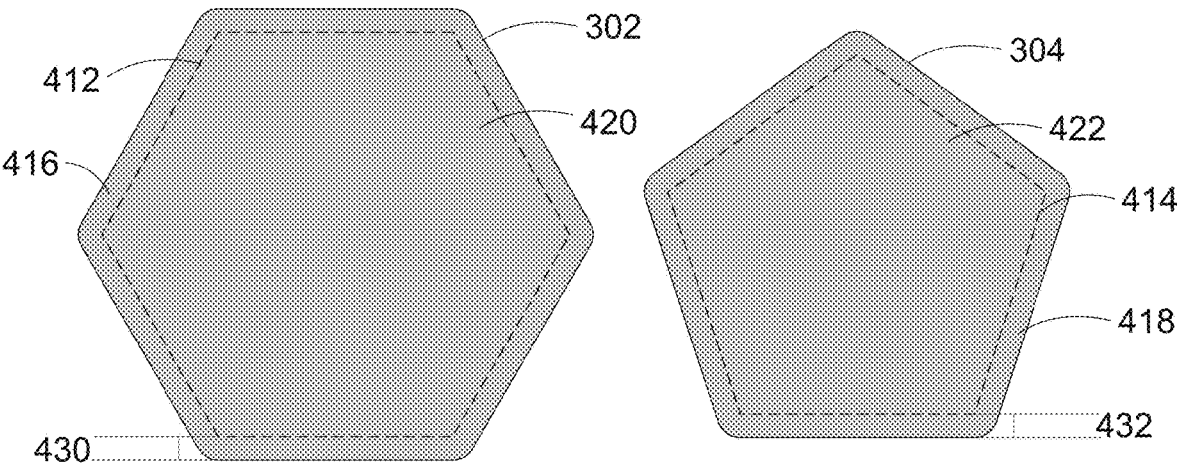
FIG. 4B illustrates fold lines and dimensions of cutouts, consistent with one or more exemplary embodiments of the present disclosure.

In an exemplary embodiment, FIG. 4B illustrates respective fold lines 412 and 414 of dimensions of cutouts 302 and 304 respectively. In an exemplary embodiment, respective fold lines 412 and 414 may be a distance of 4.5 mm away from exemplary outside edges of cutouts 302 and 304. In an exemplary embodiment, the distance is in direction of an exemplary biggest plane of a surface of an exemplary cutout. In cutout 302, based on fold lines 412, there may be an edge region 416. Similarly, in cutout 304, based on fold lines 414, there may be an edge region 418. In an exemplary embodiment, edge regions 416 and 418 may allow for panels to be attached to each other as will be explained in further detail below.

Figure 5A:
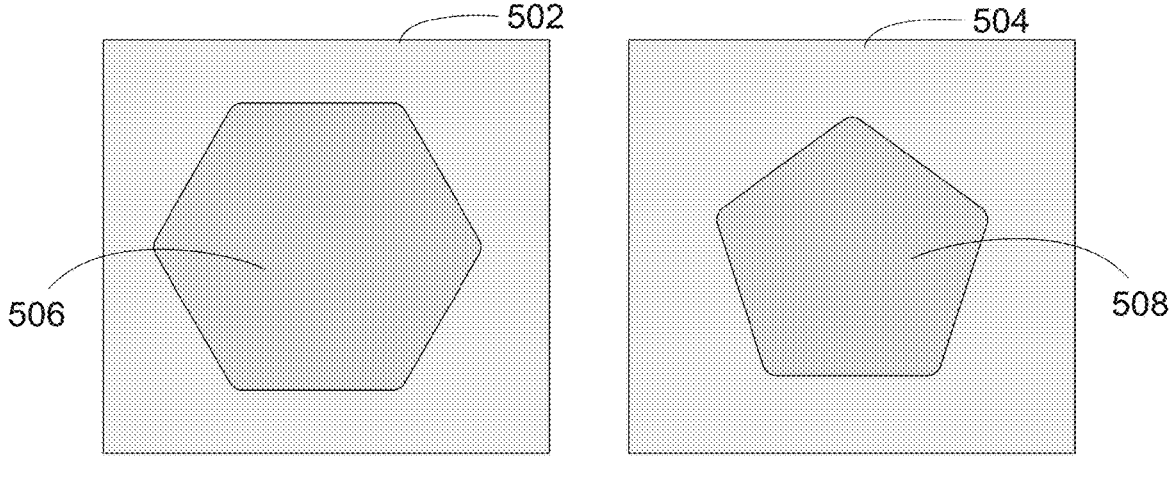
FIGS. 5A and 5B illustrate exemplary molds in top and perspective views respectively, consistent with exemplary embodiments of the present disclosure.
Figure 5B:
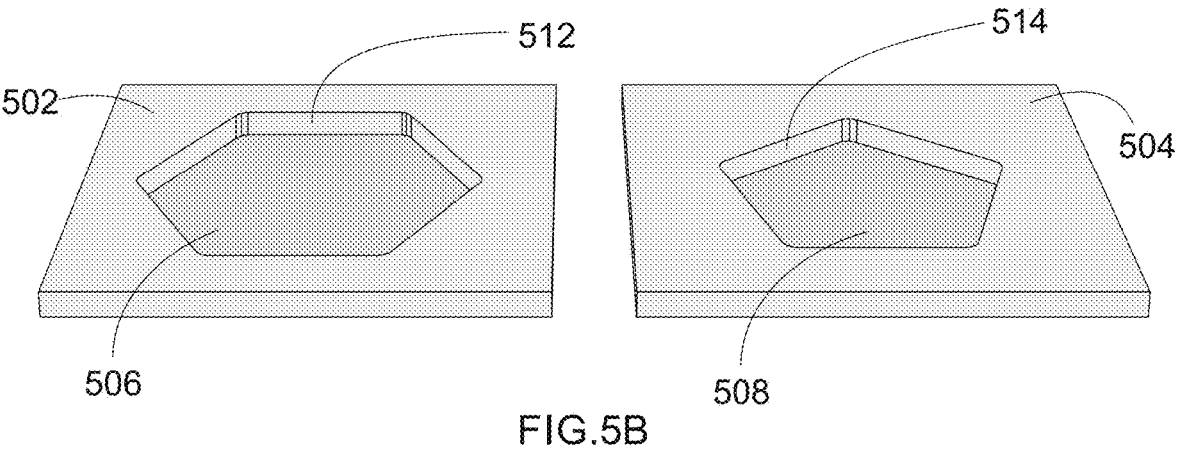

In an exemplary embodiment, FIGS. 5A and 5B illustrates exemplary molds 502 and 504 in top and perspective views respectively, consistent with exemplary embodiments of the present disclosure. Exemplary molds 502 and 504 may correspond to shape of a desired finalized panel (as discussed in further details below). In an exemplary embodiment, molds 502 and 504 may correspond to respective PUT cutouts 302 and 304. In an exemplary embodiment, finalized panel face mold parts 506 and 508 may correspond to respective areas (face areas 420 and 422) within respected fold lines 412 and 414, while finalized panel edge mold parts 512 and 514 may correspond to sections outside respected fold lines 412 and 414 (edge areas 416 and 418). As an example, when cutout 302 is placed within mold 502, face area 420 may be encompassed and be in direct contact with surface of finalized panel face mold part 506. Additionally, edge area 416 may be in direct contact with finalized panel edge mold part 512.

In an exemplary embodiment, step 116 may comprise of forming each respective panel in each respective corresponding mold by injecting melted TPE into each of the corresponding molds for thirty to forty seconds. In an exemplary embodiment, details of step 116 are explained in the context of FIGS. 6, 7A-B, 8 and 9A-C.

Figure 6:
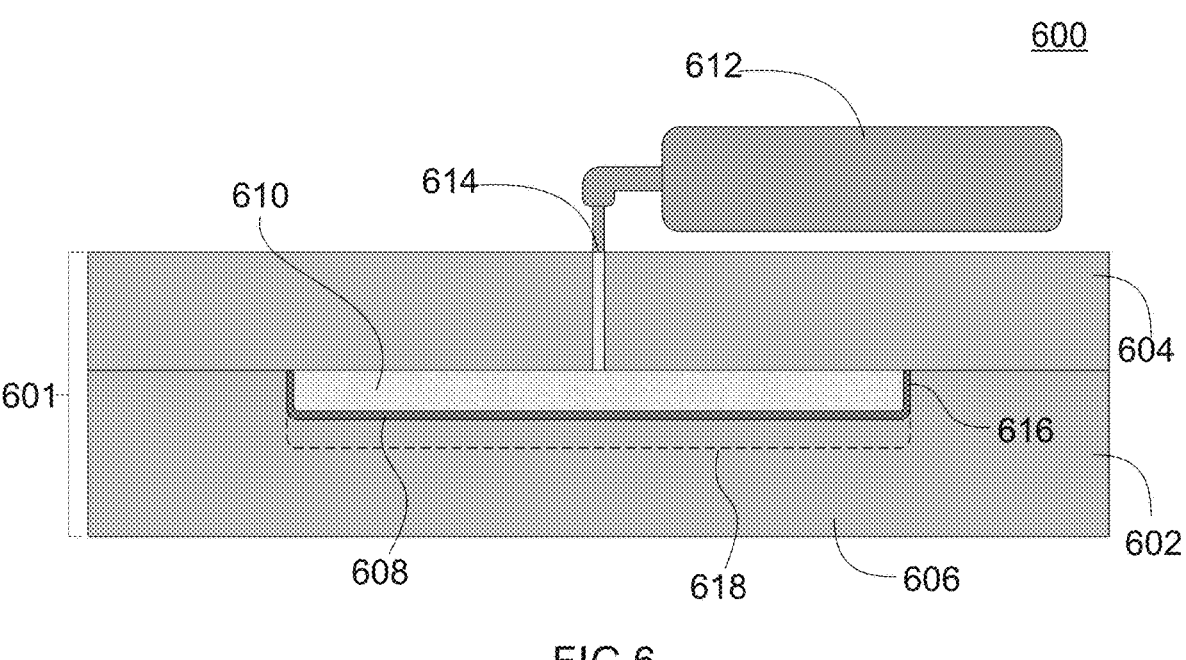
FIG. 6 displays a cross-section an exemplary scenario, consistent with one or more exemplary embodiments of the present disclosure.

In an exemplary embodiment FIG. 6 displays a cross-section an exemplary scenario 600, consistent with one or more exemplary embodiments of the present disclosure. Exemplary scenario 600 may comprise of an exemplary mold 601 comprising bottom mold part 602 and top mold part 604. In an exemplary embodiment, bottom mold part 602 may be functionally similar to molds 502 and 504. In an exemplary embodiment, molds 502 and 504 would require corresponding parts on the other side which would seal the internal space. Furthermore, bottom mold part 602 may be functionally or structurally similar to PU cutouts 302 and 304. Accordingly, folded-up part 614 may be similar to edge regions 416 and 418, and surface 618 may be similar to face areas 420 and 422. In an exemplary embodiment, an injector molder 612 connected through opening 614 where molding is injected. In an exemplary embodiment, an injector mold 612 may be a conventional injector which may be configured to inject melted mold into a space. In an exemplary embodiment, TPE granules may be placed within an injector mold 612 which may be melted by applying heat to TPE granules and the resulting melted materials may then be injected through opening 614 to fill up empty space between bottom mold part 602 and top mold part 604. In an exemplary embodiment, melted TPE may be formed by applying heat of 130 degrees to 200 degrees for between thirty to 60 seconds to exemplary TPE granules, for example, by exemplary molder 612. In an exemplary embodiment, mold 601 may be a cold mold. Accordingly, in an exemplary embodiment, after exemplary melted TPE is inserted into empty space, it may form foam in that space after a certain amount of time has passed and melted TPE is hardened to create foam. In an exemplary embodiment, foam 610 may be formed where melted TPE is inserted.

Figure 7A:
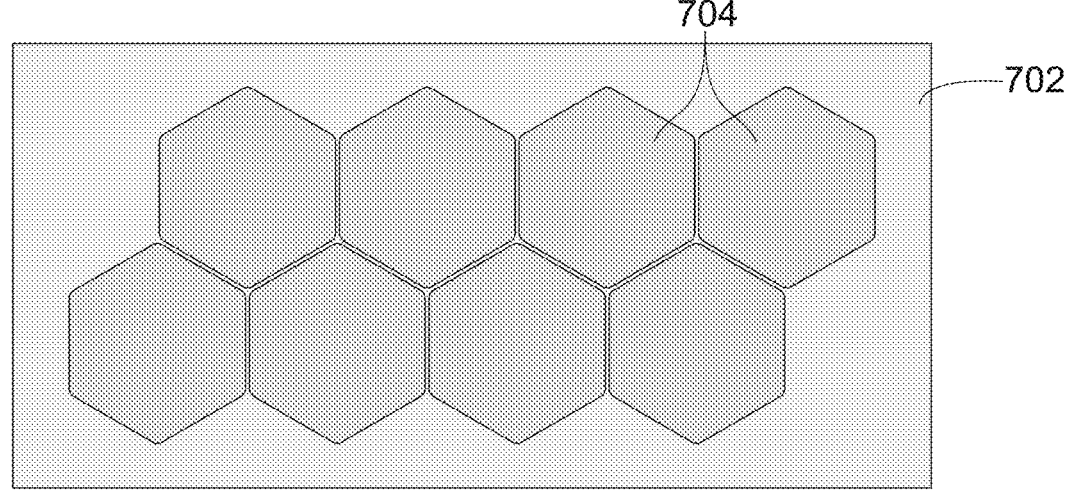
FIGS. 7A and 7B illustrate a multiple panel mold, consistent with one or more exemplary embodiments of the present disclosure.
Figure 7B:
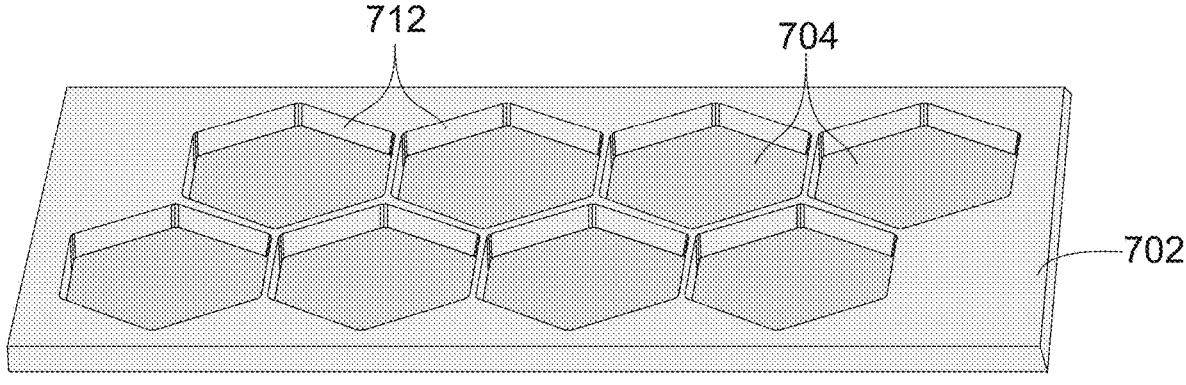

In an exemplary embodiment, FIGS. 7A and 7B illustrate a multiple panel mold, consistent with one or more exemplary embodiments of the present disclosure. In an exemplary embodiment, mold 702 may have a plurality of mold openings 704. In an exemplary embodiment, FIG. 7A illustrated a top view of mold 702 and FIG. 7B illustrated mold 702 from a perspective view. In an exemplary embodiment, each mold opening 704 may be functionally and structurally similar to finalized panel face mold parts 506 and 508. In an exemplary embodiment, mold openings 704 may be a plurality of openings but each mold may have any number of particular type of mold openings based on a require shaped of an exemplary finalized panel.

Figure 8:
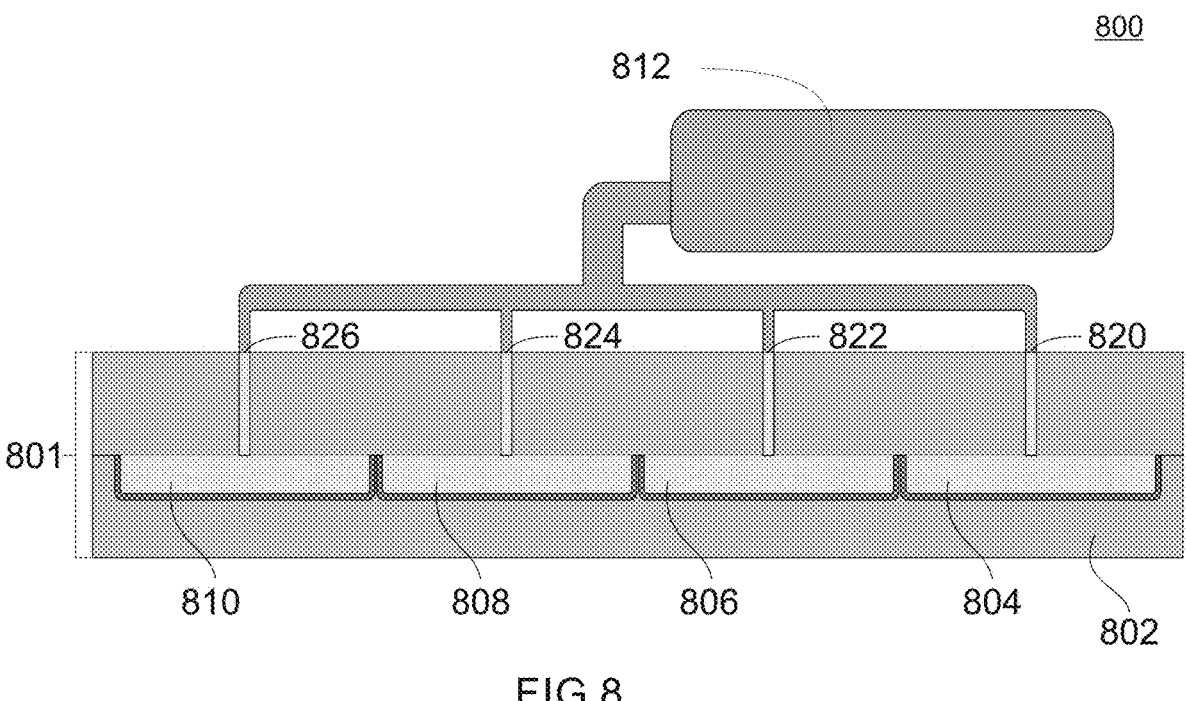
FIG. 8 displays a cross-section an exemplary scenario, consistent with one or more exemplary embodiments of the present disclosure.

In an exemplary embodiment, FIG. 8 displays a cross-section an exemplary scenario 800, consistent with one or more exemplary embodiments of the present disclosure. Exemplary scenario 800 may comprise of mold 801 which (similar to mold 601) may comprise of bottom mold part 802 and top mold part 806. In an exemplary embodiment, difference between mold 801 and mold 601 may be that mold 601 may be geared towards a singular panel while mold 801 may allow for manufacturing of multiple finalized panels at the same time. In an exemplary embodiment, bottom mold part 802 may be functionally similar to mold 702. In an exemplary embodiment, mold 702 may require corresponding parts on the other side which would seal the internal space of mold openings 704. Accordingly, in context of FIG. 8, a plurality of panels may be formed at the same time. Therefore, in an exemplary embodiment, mold injector 812 (which may be functionally similar to mold injector 612) may inject melted TPE through multiple openings, such as openings 820, 822, 824, and 826, to form foams 804, 806, 808, and 810 respectively of exemplary finalized panels.

Figure 9A:
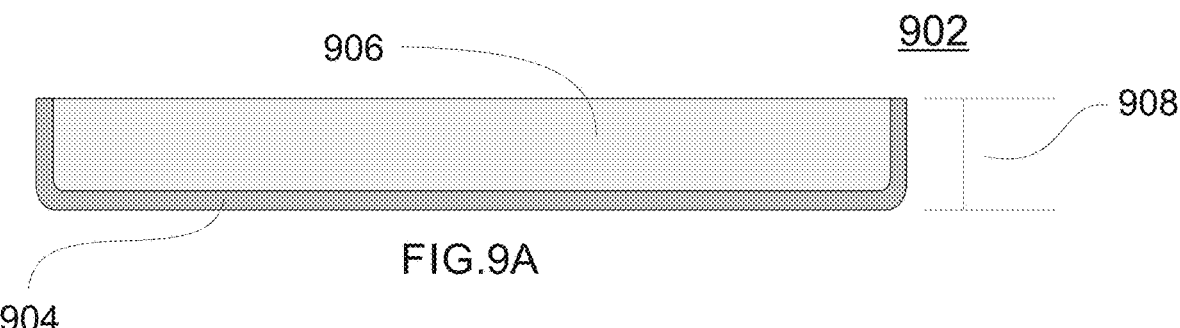
FIGS. 9A-C illustrate respective cross section, top perspective, and a bottom perspective of an exemplary finalized panel, consistent with one or more exemplary embodiments of the present disclosure.
Figure 9B:
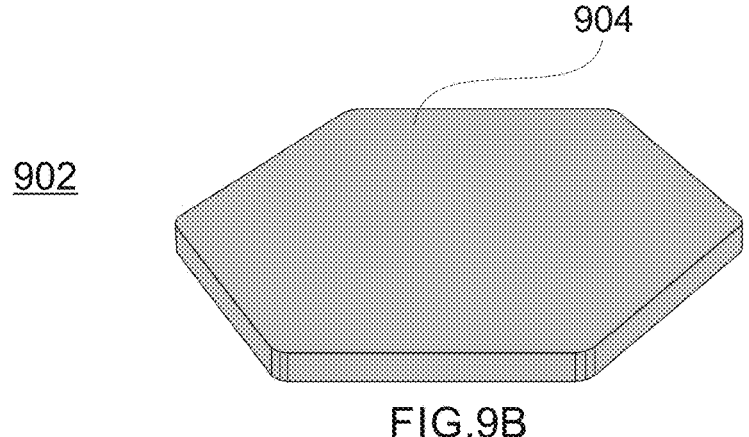
Figure 9C:
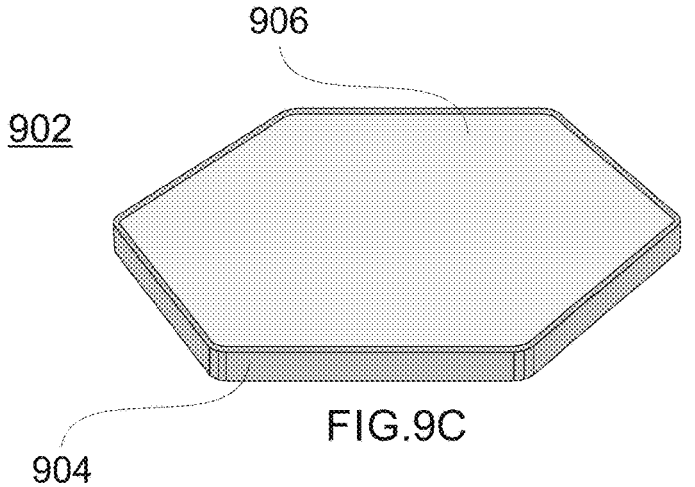

In an exemplary embodiment, FIGS. 9A-C illustrate respective cross section, top perspective, and a bottom perspective of an exemplary finalized panel, consistent with one or more exemplary embodiments of the present disclosure. In an exemplary embodiment, external surface 904 may refer to an outside surface formed for an exemplary finalized panel 902 that may be formed, for example, after step 116. In an exemplary embodiment, surface 904 may be formed based on exemplary PU cutouts 312 and 314. Accordingly, surface 904 is part of outside layer 908 which may be similar to PU cutouts 312 and 314. Accordingly, in an exemplary embodiment, finalized panel 902 may have a thickness 908 of 3 mm to 7 mm as displayed in FIG. 9A. Furthermore, in an exemplary 902 may have a thickness of 5.3 mm.

In an exemplary embodiment, FIG. 9C illustrates a bottom-view of embossed panel 902. In an exemplary embodiment, bottom-view of embossed panel 506 may clearly illustrate foam 906 formed based on exemplary melted TPE (cross-section of which is illustrated in FIG. 9A). In an exemplary embodiment, finalized panel 902 essentially comprises external surface 904 (comprising product an exemplary PU cutout) and foam 906.

In an exemplary embodiment, one of ordinary skill in the art will comprehend, that the elements illustrated within FIGS. 9B and 9C may not be drawn to scale. Instead, they have been illustrated in sizes that allow for easier comprehension. In an exemplary embodiment, while cross-section view of embossed panel 902 presented in FIG. 9A may appear flat, one of ordinary skill in the art may understand, that embosses panel 902 may have a curvature corresponding to the shape of a ball in context of a surface area of finalized panel 902.

In an exemplary embodiment, step 118 may comprise of creating a bladder valve panel by inserting a valve in one of the plurality of created panels. In further detail, in an exemplary center of an exemplary panel, such as for example, finalized panel 902, a hole may be made into which an exemplary valve may be attached.

Figure 10:
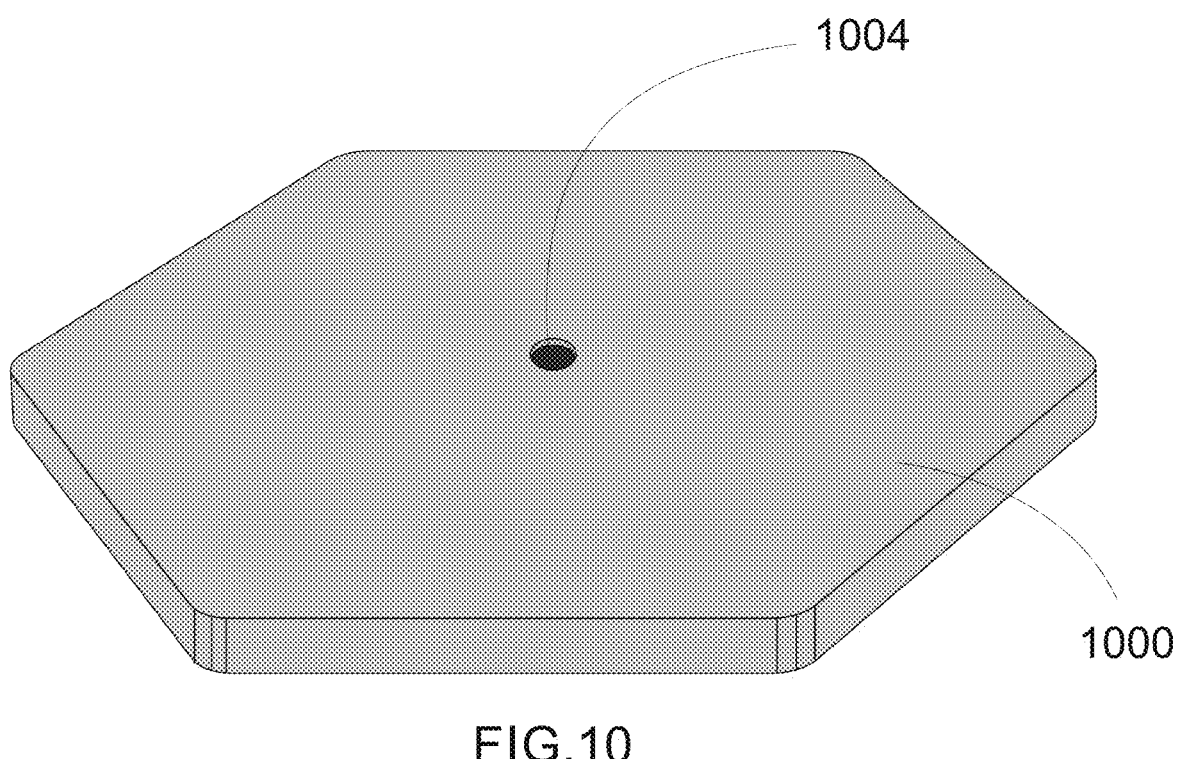
FIG. 10 illustrates exemplary an exemplary bladder valve panel, consistent with exemplary embodiments of the present disclosure.

In an exemplary embodiment, FIG. 10 illustrates exemplary an exemplary bladder valve panel similar to as produced in context of step 104, consistent with exemplary embodiments of the present disclosure. A bladder valve panel may refer to an exemplary panel of a soccer ball that has a bladder attached to it and contains a valve for filling air into the bladder or for deflating the bladder. For example, an exemplary finalized panel 902. For example, FIG. 10, illustrates a bladder valve panel 1000, consistent with exemplary embodiments of the present disclosure. In an exemplary embodiment, a cutout of bladder valve panel 1000 may be similar to finalized panel 502. In further detail to step, 118, first, a cavity may be created in the middle of an exemplary display panel where an exemplary valve may be inserted. In an exemplary embodiment, conventional methods such as punching a hole by hand or by a machine one by one. Accordingly, cavity 1004 may be formed through which an exemplary valve (of an exemplary bladder). Therefore cavity 1004 may be located on bladder valve panel 1000.

Now referring back to method 100, in an exemplary embodiment, method 100 may further comprise step 104 comprising forming a pre-finalized ball by attaching the plurality of the panels including the bladder valve panel to a bladder and respective edges to each of the plurality of the panels to respective edges of adjacent panels of the plurality of the panels. In an exemplary embodiment, further details with respect to step 104 may be clearly illustrated in combination with FIGS. 12A-14C.

Figures 11A, 11B:
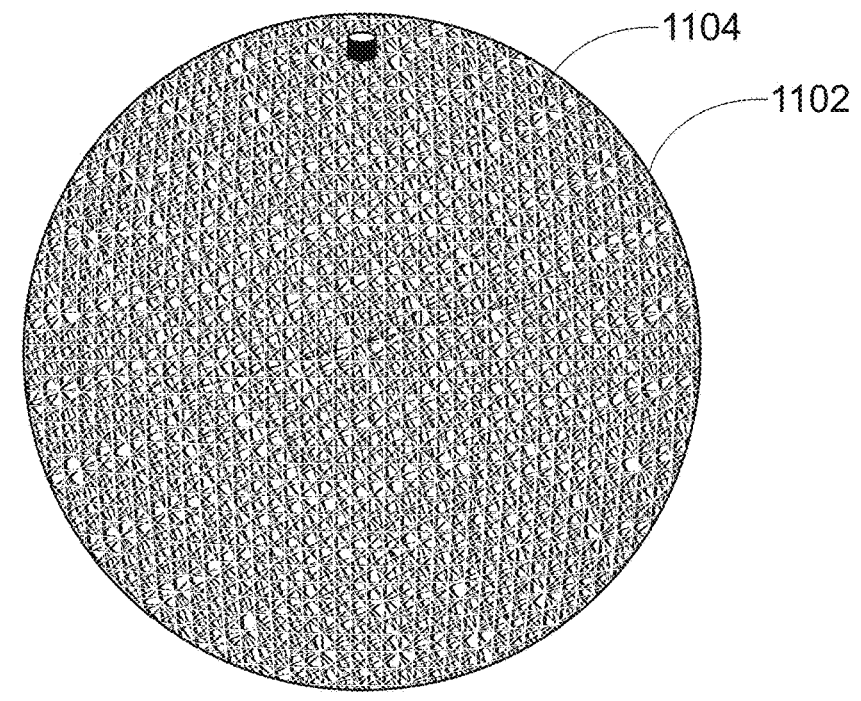
FIGS. 11A and 11B illustrate two exemplary bladders, consistent with exemplary embodiments of the present disclosure.

In an exemplary embodiment, FIGS. 11A and 11B illustrate two exemplary bladders 1100 and 1102, consistent with exemplary embodiments of the present disclosure. As illustrated, exemplary bladders 1100 and 1102 are both attached to exemplary valve 1104. In an exemplary embodiment, exemplary bladder valve panel as described in context of step 118 may be attached to this valve.

In an exemplary embodiment, bladder 1100 may comprise a molded rubber or butyl bladder or synthetic rubber that may be laminated with polyester or polyester cotton cloth strips. In an exemplary embodiment, bladder 1102 may comprise a molded rubber or butyl or synthetic rubber that may be wound with polyester or nylon threads. In an exemplary embodiments, additional bladders, with restricted circumference properties may be used. In exemplary embodiments, valve 1104 may be used for inflating or deflating bladders 1100 and 1102. Exemplary bladders aid in providing firmness and roundness to a soccer ball, in addition to serving as an exemplary base on top of which exemplary panels are attached.

Figure 12A:
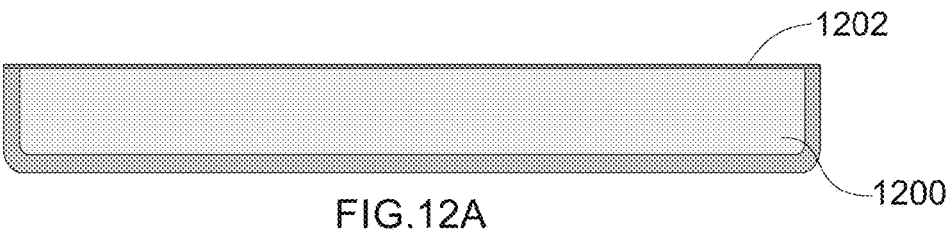
FIGS. 12A-C illustrate cross-sections of exemplary scenarios with exemplary latex or adhesive applied to exemplary finalized panels, consistent with one or more exemplary embodiments of the present disclosure.
Figure 12B:
Figure 12C:
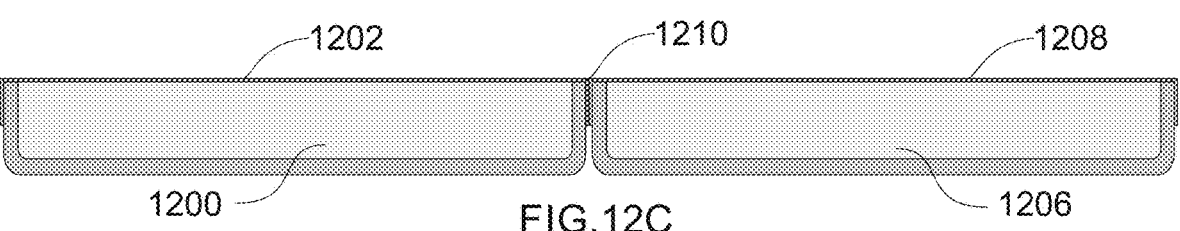

Referring back to details of step 104, referring to attaching the plurality of the panels to a bladder may include attaching a set of panels to an exemplary bladder. In an exemplary embodiment, this may entail applying a latex or and adhesive all around on an outer surface of an exemplary bladder such as bladder 1100 and 1102. In an exemplary embodiment, an exemplary later may be applied on each finalized panel of the plurality of panels as well. FIGS. 12A-C illustrate cross-sections of exemplary scenarios with exemplary latex or adhesive applied to exemplary finalized panels, consistent with one or more exemplary embodiments of the present disclosure. In an exemplary embodiment, as illustrated in FIGS. 12A, finalized panel 1200 may have adhesive or latex 1202 applied just on an exemplary bottoms surface (side with exemplary foam formed therein) which is meant to be attached to an exemplary bladder (such as bladders 1100 or 1102). In a second exemplary scenario as displayed in FIG. 12B, finalized panel 1200 may have adhesive or latex 1204 applied exemplary bottom surfaces (side of finalized panel with exemplary foam formed therein) and also at least half of the sides of finalized panels encompassing exemplary PU cutouts. In an exemplary embodiment, this may allow for two adjacent finalized panels to be connected with each other, in addition to being connected to an exemplary bladder. In an exemplary embodiment, FIG. 12C illustrated such an exemplary scenario, when finalized panel 1200 with adhesive or latex 1204, may be attached or connected to finalized panels 1206 with adhesive or latex 1208. In an exemplary embodiment, finalized panels 1200 and 1206 may be formed utilizing similar techniques and their edges may correspond to each other. Furthermore, latex and adhesives 120, 1204, and 1206 may be similar in terms of composition but may be applied as illustrated in the respective figures.

In an exemplary embodiment, bladder valve panel would be attached corresponding to an exemplary location of an exemplary valve on an exemplary bladder and remaining plurality of panels would be attached accordingly.

Figure 13A:
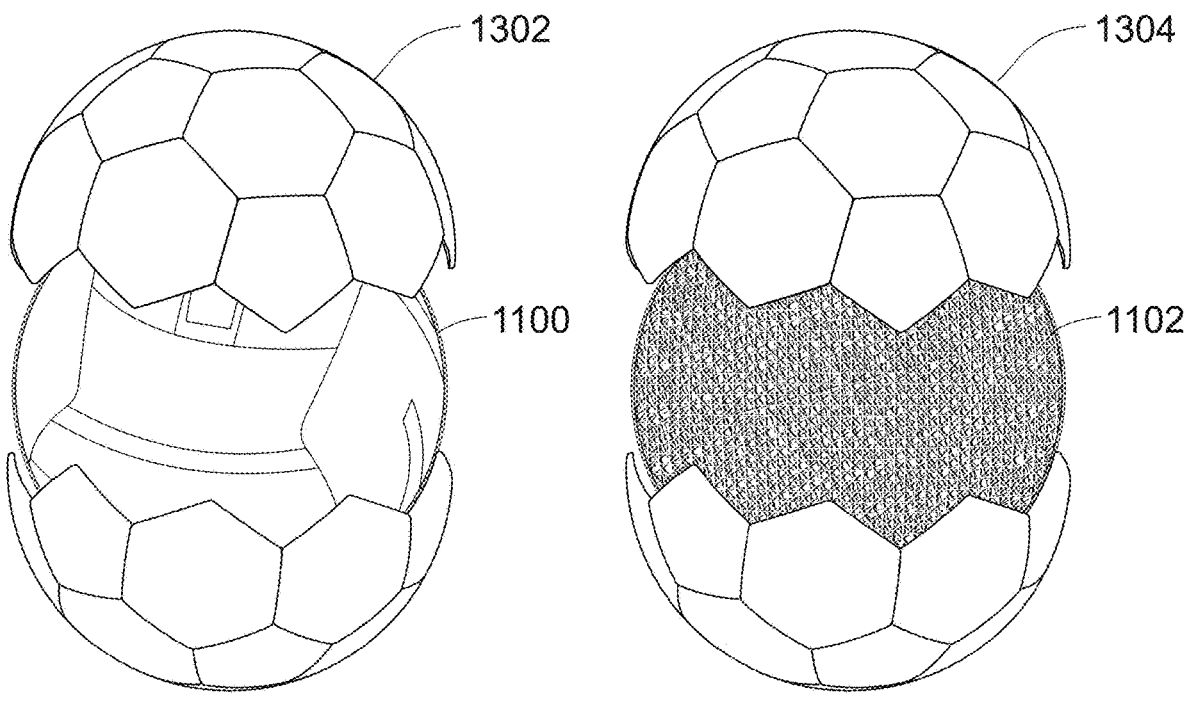
FIGS. 13A and 13B, illustrate exemplary stages of forming a pre-finalized balls, consistent with one or more exemplary embodiments of the present disclosure.
Figure 13B:
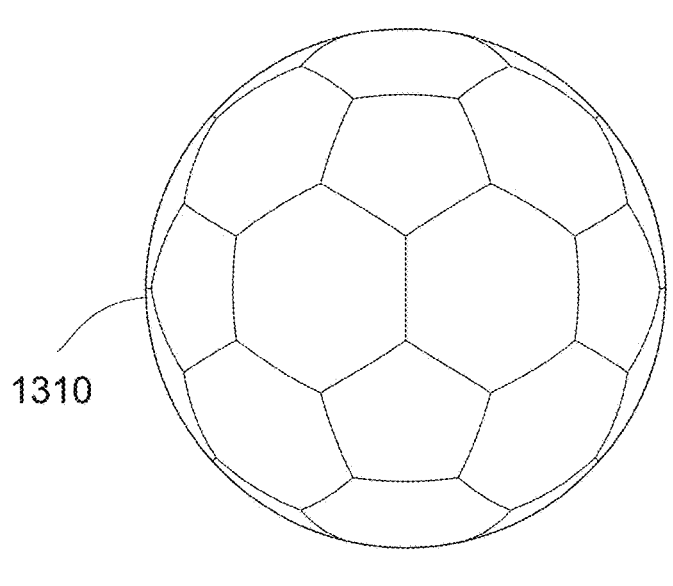

FIGS. 13A and 13B, illustrate exemplary stages of forming a pre-finalized balls, consistent with one or more exemplary embodiments of the present disclosure. In an exemplary embodiment, FIG. 13A illustrates plurality of panels 1302 and plurality of panels 1304 being placed respectively around bladders 1100 and 1102. In an exemplary embodiments, plurality of panels 1302 and 1304 may be exemplary panels formed utilizing step 102 of method 100. For simplicity, plurality of panels 1302 and 1302 are not illustrated displaying the valve panel but one of ordinary skill in the art would comprehend that one of the panels would be an exemplary bladder valve panel.

FIG. 13B displays a finalized ball 1310 that may comprise an internal exemplary bladder with exemplary plurality of panels attached thereon utilizing an exemplary latex or adhesive. In an exemplary embodiment, plurality of panels may also be attached to each other utilizing an exemplary latex or adhesive. In further detail, adhesives may be attached between respective edges of all the plurality of embossed panels. Therefore, in addition to the respective adhesives attaching the respective plurality of panels to an exemplary surface of an exemplary bladder, exemplary plurality of panels may also be attached to each other. In an exemplary embodiment, once all exemplary embossed panels for an exemplary sports ball are attached to an exemplary bladder utilizing an adhesive or glue, a bladder contained within a soccer ball may be completely filled with air.

In an exemplary embodiment, step 106 may comprise placing the pre-finalized sports ball in a mold and applying heat to the pre-finalized sports ball. In an exemplary embodiment, an exemplary pre-finalized sports ball may be placed in a heated molding machine (not shown) which is round in the finalized shape of a soccer ball. Heating under pressure of the inner cover of a molding machine may then be applied to the soccer ball for providing a permanent shape and thermo-bonding all of the elements contained within an exemplary mold for form an exemplary soccer ball.

In an exemplary embodiment, an exemplary soccer ball may be molded at 70 degrees Celsius for thirty seconds to sixty seconds. Accordingly, a total of sixty seconds of heat of 70 degrees Celsius may be applied to the soccer ball. Therefore, an exemplary the ball sets uniformly from outside through the pressure generated owing to the hot mold and inside due to the pressure from the bladder. In an exemplary embodiment, this may aid in providing a permanent shape to a sports ball and strengthen its bond on whole.

Figure 14A:
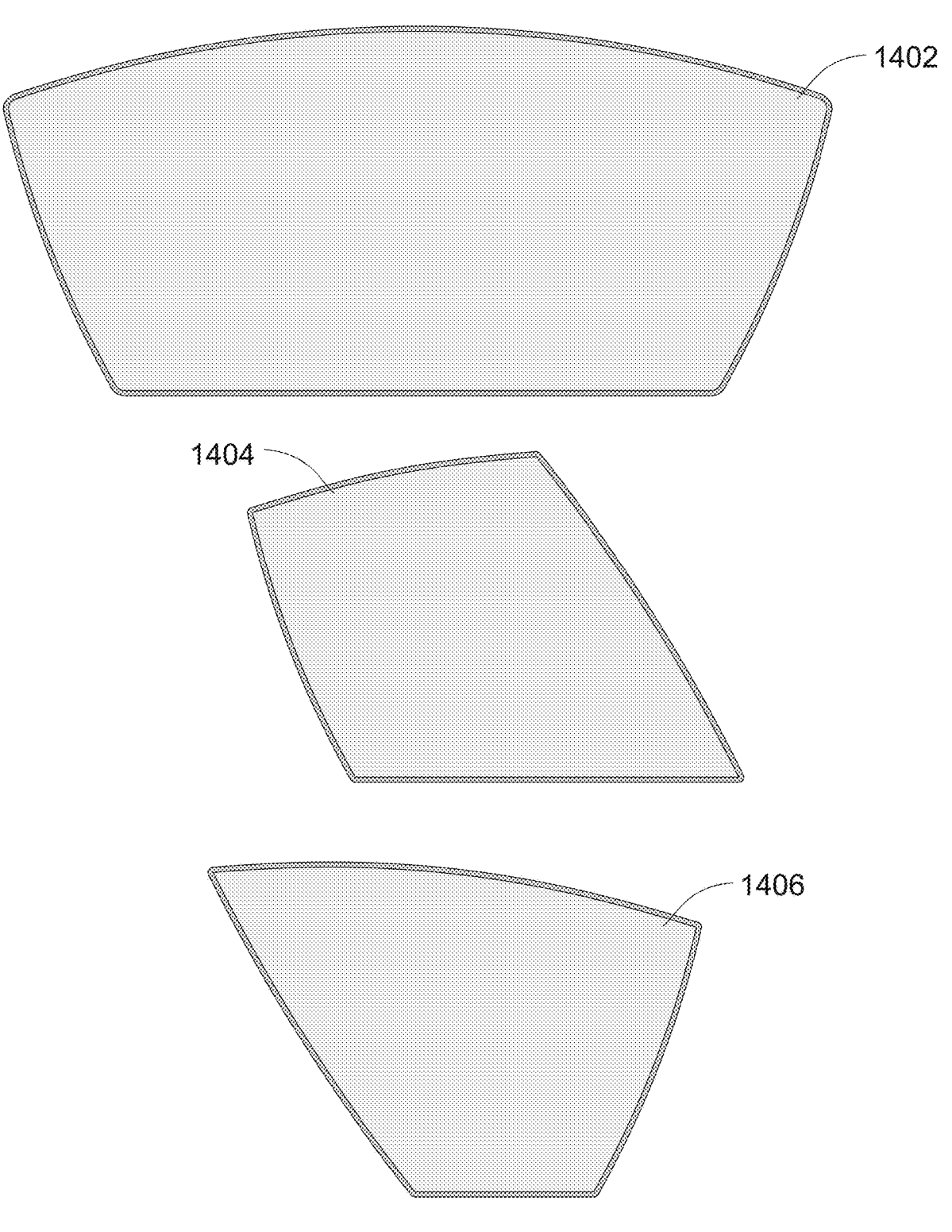
FIGS. 14A-C illustrated exemplary panel shapes that may form an outer covering of an exemplary soccer ball, consistent with one or more exemplary embodiments of the present disclosure.
Figure 14B:
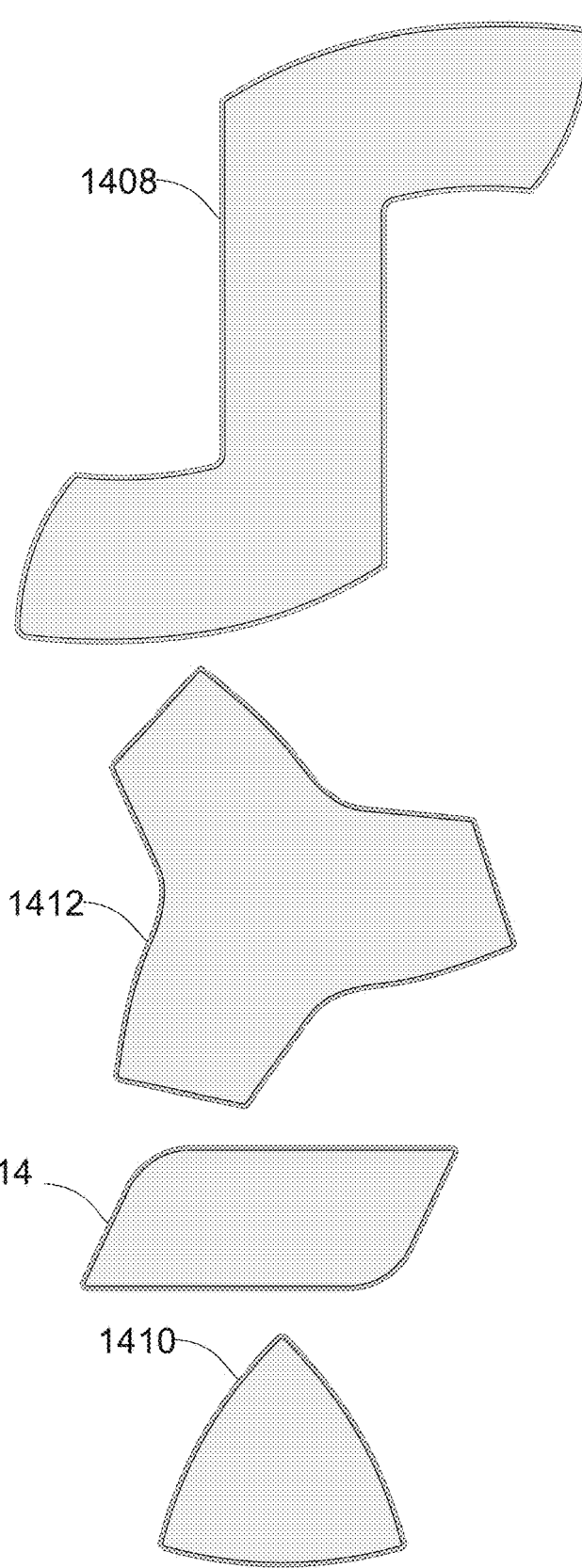
Figure 14C:
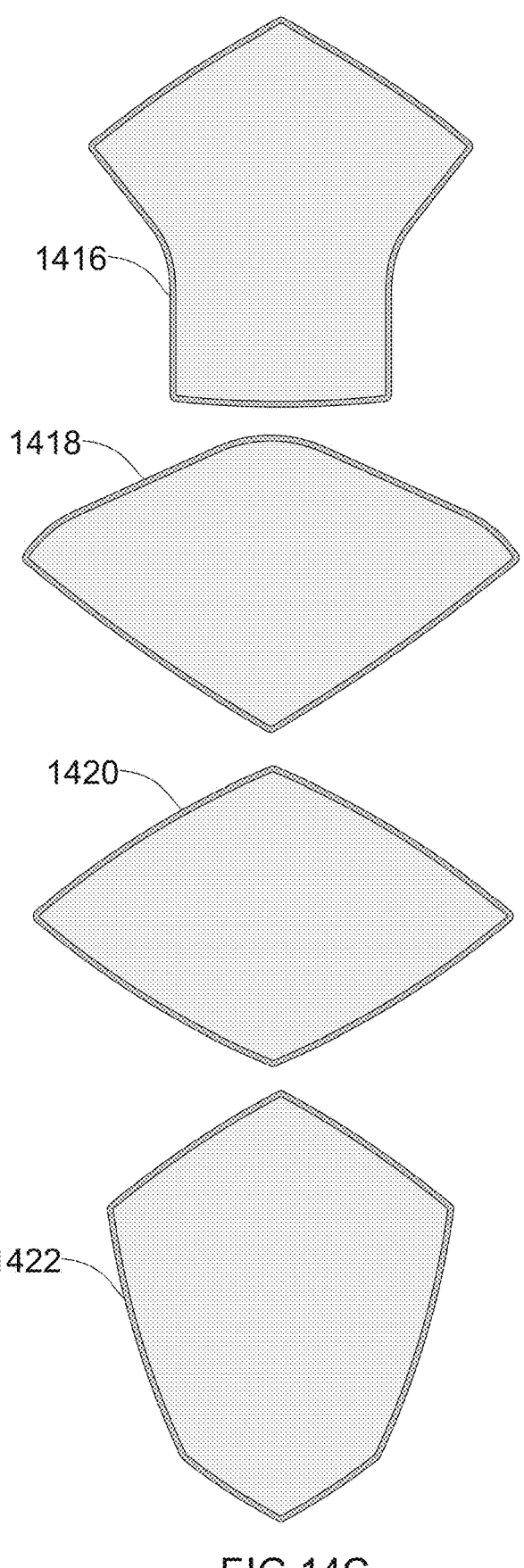

In an exemplary embodiment, one or ordinary skill in the art would comprehend, that an exemplary plurality of panels may not be restricted to shapes as illustrated in some exemplary embodiments, but any combination of individual panels which may form exemplary of plurality of panels which in combination can be attached to exemplary bladders to form a pre-finalized ball. FIGS. 14A-C illustrated exemplary panel shapes that may form an outer covering of an exemplary soccer ball, consistent with one or more exemplary embodiments of the present disclosure. For example, a plurality of exemplary panels with shapes of panels 1402, 1404, and 1406 as illustrated in FIG. 14A may form an exemplary outside covering of an exemplary soccer ball. Similarly, a plurality of exemplary panels with shapes of panels 1408, 14010, 1412, and 1414 as illustrated in FIG. 14B may form an exemplary outside covering of an exemplary soccer ball. Additionally, a plurality of exemplary panels with shapes of panels 1416, 1418, 1420, and 1422 as illustrated in FIG. 14C may form an exemplary outside covering of an exemplary soccer ball. In an exemplary embodiment, each exemplary panel displayed in FIGS.

14A-14C may be formed utilizing step 102 of method 100. Accordingly, an exemplary mold's shape would be similar to required panel shape but the principles as described in exemplary embodiments may remain consistent.

In any exemplary embodiments, any seams in an exemplary ball between exemplary embossed panels may be sealed by application of sealants before or after molding. Exemplary sealants may include polyurethane liquids among others.

In an exemplary embodiment, exemplary soccer balls manufactured according to exemplary methods aid in reducing manufacturing costs significantly, while at the same time, the ball rebounds, has water resistance/absorption, and has abrasion properties that are superior to the characteristics of current hand stitched and thermos-bonded balls. Furthermore, exemplary thermo-bonded balls may allow for intricate designs and graphics to be applied directly to the surface of the ball, resulting in visually appealing and professional appearance.

In an exemplary embodiment, exemplary thermos-bonded panels utilized to form a sport ball utilizing exemplary approaches may be applied in any types of balls that utilize panels and bladders, such as footballs, rugby balls, volleyballs, water polo balls, handballs etc.

What is claimed:

1. A manufacturing method of a sports ball, comprising the steps of:
   forming a plurality of panels, comprising:
      cutting a plurality of Polyurethane (PU) layer cutouts corresponding to a respective shape for each of the plurality of panels from a sheet of PU, wherein the PU layer cutouts have an end-to-end length of 87 mm or 78.3 mm:
      placing each of the plurality of PU layer cutouts in a corresponding mold, wherein a shape of the corresponding mold corresponds to a shape of a finalized panel, wherein placing the each of the plurality of PU layer cutouts in the corresponding mold comprises folding the PU layer cutouts 4.5 mm from respective edges of the PU layer cutouts, wherein respective walls corresponding to folded parts of PU layer cutouts;
      forming each respective panel in each respective corresponding mold by injecting melted TPE into each of the corresponding molds for thirty to forty seconds,
      creating a bladder valve panel by inserting a valve in one of the plurality of created panels;
   forming a pre-finalized ball by attaching the plurality of the panels including the bladder valve panel to a bladder and respective edges to each of the plurality of the panels to respective edges of adjacent panels of the plurality of the panels; and
   placing the pre-finalized sports ball in a mold and applying heat to the pre-finalized sports ball, wherein the applying heat to the pre-finalized sports ball comprises applying 70 degrees Celsius for thirty seconds to sixty seconds.

2. A manufacturing method of a sports ball, comprising the steps of:
   forming a plurality of panels, comprising:
      cutting a plurality of Polyurethane (PU) layer cutouts corresponding to a respective shape for each of the plurality of panels from a sheet of PU:
      placing each of the plurality of PU layer cutouts in a corresponding mold;

forming each respective panel in each respective corresponding mold by injecting melted TPE into each of the corresponding molds for a pre-determined amount of time, creating a bladder valve panel by inserting a valve in one of the plurality of created panels;

forming a pre-finalized ball by attaching the plurality of the panels including the bladder valve panel to a bladder and respective edges to each of the plurality of the panels to respective edges of adjacent panels of the plurality of the panels; and placing the pre-finalized sports ball in a mold and applying heat to the pre-finalized sports ball.

3. The method of claim 2, wherein placing the each of the plurality of PU layer cutouts in the corresponding mold comprises a corresponding mold corresponding to a shape of a finalized panel.

4. The method of claim 3, wherein the PU layer cutouts have an end-to-end length of 87 mm or 78.3 mm.

5. The method of claim 4, wherein placing the each of the plurality of PU layer cutouts in the corresponding mold comprises folding the PU layer cutouts 4.5 mm from respective edges of the PU layer cutouts, wherein respective walls corresponding to folded parts of PU layer cutouts.

6. The method of claim 5, wherein applying heat to the pre-finalized sports ball comprises applying 70 degrees Celsius for thirty seconds to sixty seconds.

7. The method of claim 5, wherein the pre-determined amount of time comprising thirty to forty seconds.

8. The method of claim 2, further comprising forming the bladder by wrapping a rubber bladder with a fabric or yarn.

\* \* \* \* \*